[11] 3,629,603

[72] Inventor Ronald A. Andrews
  Alexandria, Va.
[21] Appl. No. 12,948
[22] Filed Feb. 20, 1970
[45] Patented Dec. 21, 1971
[73] Assignee The United States of America as
  represented by the Secretary of the Navy

[54] MEANS AND METHOD FOR OPTICAL PARAMETRIC UP CONVERSION OF IR IMAGES
  7 Claims, 2 Drawing Figs.

[52] U.S. Cl. .................................................. 307/88.3,
  250/83.3 HP
[51] Int. Cl. ................................................ H03f 7/00

[50] Field of Search .......................................... 307/88.3;
  250/83.3 HP, 213 R

[56] References Cited
  UNITED STATES PATENTS
  3,530,301  9/1970  Boyd et al. .................... 307/88.3

*Primary Examiner*—John Kominski
*Assistant Examiner*—Darwin R. Hostetter
*Attorneys*—R. S. Sciascia, Arthur L. Branning, J. G. Murray and M. L. Crane

ABSTRACT: This invention provides a means and method of increasing the annular tolerance on the propagation of infrared radiation through a nonlinear crystal for phase-matched up conversion of infrared images to the visible light.

INVENTOR
RONALD A. ANDREWS

MEANS AND METHOD FOR OPTICAL PARAMETRIC UP CONVERSION OF IR IMAGES

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

Heretofore, infrared (IR) images have been up converted to the visible by means of phase-matched (PM) optical parametric processes in a material with nonlinear susceptibility. The PM condition requires that the direction of propagation of the IR radiation be well defined with respect to the crystal axis of the nonlinear crystal and the direction of an associated "pump" radiation. PM up conversion of IR is dependent on the particular crystal material, the wavelengths of light involved, and the directions in which the IR and "pump" radiation propagate through the crystal material. These parameters, along with the length of the nonlinear crystal determine the angular aperture or angular tolerance on the propagation direction of the IR radiation for PM up conversion. In the prior art, IR radiation including spatial information in the form of IR images has been confined to an angular aperture or "window" of only a few degrees in order for the image to be up converted. In general, image up conversion techniques are divided into two basic cases which differ in the type of light used to illuminate the object being imaged. In both cases, the up converted image is of frequency $\omega s = \omega p + \omega ir$ where the subscripts $s$, $p$, and $ir$, refer to sum, pump, and infrared, respectively. The major difference between the two is whether $\omega ir$ is broadband or a narrow laser line. In the first case, the PM condition is satisfied for different values of both $\omega s$ and $\omega ir$ for different image points. This type of up conversion has been set forth in an article "Infrared Up Conversion in Lithium-Niobate With Large Bandwidth and Solid Acceptance Angle" by J. E. Midwinter, published in *Applied Physics Letters* Vol. 12, pg. 68, 1968. In the second case, which in relevant here, $\omega ir$ is fixed, and hence for a given material and geometry, there will be some fixed angular aperture within which light of frequency $\omega ir$ can be phase matched for up conversion. This angular aperture can be maximized if noncritical phase matching (NCPM) is used as set forth by J. Warner in "Phase Matching for Optical Up Conversion With Maximum Angular Aperture—Theory and Practice," *Opto-Electronics*, Vol. 1, pg. 25, 1969.

SUMMARY OF THE INVENTION

This invention makes use of a nonlinear crystal such as potassium dihydrogen phosphate, KDP, oriented so that its C-axis makes an angle $\theta$ with the direction of the pump radiation such as the output of a high-power laser incident on the crystal. The infrared radiation to be up converted is approximately centered about the direction of the pump radiation and is confined to a cone with an apex angle $\alpha$. When the angle $\theta = \theta_o$, the IR radiation in the center of the angular aperture defined by the angle $\alpha$ is noncritically phase matched. For this orientation, the PM infrared radiation makes an angle $\Phi_o$ with the direction of the pump radiation. In this position, the IR image that is seen upon passing through the crystal is limited to a small angle $\Phi$ and does not include the entire angle $\alpha$. It has been determined that the phase-matched condition may be varied thereby effectively creating a larger angular aperture for infrared images. This larger angular aperture is obtained by rotating the crystal in a plane defined by the direction of the pump radiation and the "C"-axis of the crystal. The effect can also be produced by varying any physics parameter of the crystal which changes its indices of refraction. Such variations may include temperature, application of stress or electric field. In the case of crystal rotation, the phase-matched condition is scanned by slightly increasing the angle $\theta$. As $\theta$ is increased IR radiation in hollow cones defined by $\Phi - \Phi_o$ = constant is up converted with $\Phi - \Phi_o$ increasing as $\theta_0$ increases. In this way all the IR radiation entering the angular aperture defined by the angle $\alpha$ is up converted. Typically in KDP crystal, a variation in $\theta$ of 1.5° produces an angular aperture, $\alpha$ greater than 15°. The particular technique for increasing the allowed angular tolerance on the IR radiation for PM up conversion in a nonlinear crystal material has been set forth in an article, "Wide Angular Aperture Image Up Conversion" by R. A. Andrews in *IEEE Journal of Quantum Electronics*, Vol. QE–5, No. 11, Nov. 1969.

NRL Report 6941, "A Computer Program To Analyze Optical Parametric Up Conversion Processes In Nonlinear Crystals" by R. A. Andrews, sets forth the range of IR wavelengths that can be converted in a phase-matched (PM) process, the PM orientation of the wave vectors for critical and noncritical phase matching, the angular aperture for PM conversion, and the maximum number of resoluable lines for image conversion.

STATEMENT OF THE OBJECTS

It is therefore an object of the present invention to provide a method and means for increasing the angular aperture for parametric up conversion.

Another object is to provide a means and method of maintaining image information of a distant object for detection or observation at an up converted wavelength.

Still another object is to provide a means and method for image up conversion over a wide angular view without any loss in image intensity or resolution.

DETAILED DESCRIPTION OF THE INVENTION

Figure 1:
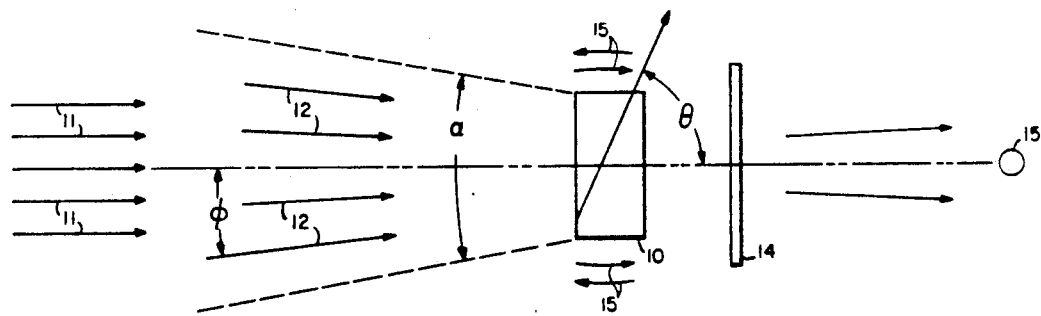
FIG. 1 illustrates a diagrammatic view of the system.
Figure 2:
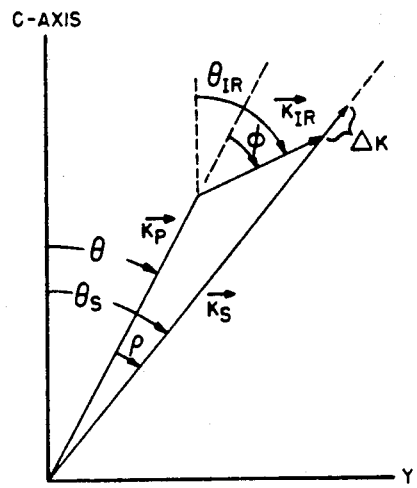
FIG. 2 illustrates the crystal geometry for up conversion from infrared to visible wavelengths.

Now referring to the drawings there is shown by illustration a schematic drawing of the device which illustrates a potassium dihydrogen phosphate (KDP) nonlinear crystal 10 positioned within a path of an intense coherent pump source of laser light 11 whose wavelength is for instance 0.6943 $\mu$ and infrared radiation 12. The KDP crystal is orientated so that its C-axis makes an angle $\theta$, where $\theta$ may be from 55.70° to 59.70°, with the direction of the incident pump radiation and the IR radiation is confined to a cone which is approximately centered about the direction of the pump radiation. The cone has an apex angle $\alpha$ and makes an angle $\Phi$ with the direction of the pump radiation. The angle $\theta = \theta_o$ is determined so that the IR radiation in the center of the angular aperture defined by the angle $\alpha$ is noncritically phase matched. For this orientation, the PM IR radiation makes an angle $\Phi_o$ with the direction of the pump radiation. A filter 14 is placed in the light path of the light that passes through the KDP crystal for filtering out any radiation other than that of the up converted radiation. A light detector 15 is positioned to receive the light that is transmitted by the filter or one may view the transmitted image since it has been up converted to the visible.

It has been determined that when the KDP crystal is orientated such that the C-axis makes an angle $\theta_o$ with respect to incident pump radiation, the incident IR radiation may be up converted to the visible. Also, the incident IR radiation that is up converted is limited to a particular angle less than 2°. Thus, in carrying out this invention, the KDP crystal is rotated about an axis perpendicular to the plane formed by the direction of pump radiation and the crystal C-axis to scan the phase match condition for the incident light as shown by the arrows 15 thereby increasing the angle of up converted radiation. In this way, all of the IR radiation entering the angular aperture defined by $\alpha$ is up converted. Typically in KDP crystals, a variation in $\theta$ of 1.5° produces an angular aperture, $\alpha$, greater than 15°.

In carrying out the teaching of the invention, a pump light source of an intense light frequency is directed onto a KDP crystal oriented with the C-axis at an angle $\theta_o$ with respect to the direction of the pump radiation. The pump source and KDP crystal are arranged such that the infrared radiation to be detected is centered about the pump source direction. For a fixed brightness, an incoherent infrared source depends only on the acceptance angle of the up converted crystal or associated optics and the total sum frequency power produced for a fixed laser power and fixed brightness for the infrared source is independent of the area of the mixing crystal used. Since the infrared radiation detected depends on the acceptance angle of the crystal, the crystal is rotated about the horizontal axis to vary the orientation of the crystal thereby increasing the angle of acceptance. The pump source radiation and infrared radiation to be up converted are phase matched within the crystal thereby bringing about an up conversion of the incident infrared radiation which may be seen by the naked eye or detected by a detector such as a camera, phototube or any other device that detects visible light.

As an example of operation, pump radiation produced by a ruby laser having a pulsed output of 100 megawatt with a wavelength of $0.6943\mu$ with ordinary polarization and an infrared source derived from a Nd-doped YAG laser having continuous wave output of 1 watt at $1.06\mu$ with extraordinary polarization is up converted to $0.4195\mu$ radiation with extraordinary polarization. The phase-matched angles in KDP for up conversion are set forth in the articles previously listed. The feature of increasing the angular aperture for up conversion provides an imaging system with a wider angle of view without any loss in image intensity or resolution. Therefore, one may more effectively observe infrared images visually by use of the above-described system.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A system for up conversion of infrared images to visible radiation which comprises:
    a nonlinear crystal means,
    a pump radiation source for directing radiation onto said crystal normal to a face thereof,
    said nonlinear crystal including a C-axis which makes an angle of from about 55.7° to about 59.7° relative to said pump radiation which satisfies a phase match requirement,
    and means for changing the position of said crystal relative to the axis of the pump radiation to scan incident infrared radiation,
    Whereby said incident infrared radiation is up converted on passing through said nonlinear crystal.
2. A system as claimed in claim 1; which includes,
    an optical filter positioned to receive light transmitted by said crystal to filter out any radiation other than said up converted radiation.
3. A system as claimed in claim 1; wherein,
    said pump radiation is of an intense coherent source whose wavelength is near the long-wavelength edge of the visible spectrum.
4. A method of up converting infrared images, which comprises:
    directing a pump radiation toward a nonlinear crystal,
    positioning said nonlinear crystal such that the C-axis makes an angle from about 55.7° to about 59.7° with the direction of the pump radiation,
    positioning the crystal and pump radiation direction such that infrared radiation to be up converted is centered about said pump radiation, and
    moving said nonlinear crystal about an axis in a direction that changes the angle relative to the pump radiation thereby "seeing" a wider angle of incident infrared radiation,
    whereby said incident infrared radiation and pump radiation are phase matched to up convert said infrared radiation and maintain any image information.
5. A method as claimed in claim 4, wherein,
    said pump radiation is directed onto a KDP crystal.
6. A method as claimed in claim 5; wherein,
    the pump radiation directed onto said KDP crystal is an intense source of laser light whose wavelength is near the long-wavelength edge of the visible spectrum.
7. A method as claimed in claim 4; which includes,
    changing any physical parameter of said crystal which changes the indices of refraction of the crystal to increase the viewing aperture.

* * * * *